United States Patent [19]

Ramamurthi et al.

[11] Patent Number: 5,306,555

[45] Date of Patent: Apr. 26, 1994

[54] AEROGEL MATRIX COMPOSITES

[75] Inventors: Sangeeta Ramamurthi; Mukund Ramamurthi, both of West Worthington, Ohio

[73] Assignee: Battelle Memorial Institute, Columbus, Ohio

[21] Appl. No.: 904,777

[22] Filed: Jun. 26, 1992

Related U.S. Application Data

[63] Continuation-in-part of Ser. No. 761,577, Sep. 18, 1991, abandoned.

[51] Int. Cl.$^5$ .............................................. D04H 1/58
[52] U.S. Cl. ................................ 428/289; 252/315.1; 428/297; 501/12
[58] Field of Search ...................... 252/315.1; 501/12; 428/289, 297

[56] References Cited

U.S. PATENT DOCUMENTS

| | | | |
|---|---|---|---|
| 2,808,338 | 10/1957 | Bruno et al. | 252/62 |
| 2,945,817 | 7/1960 | Goldblum | 252/62 |
| 3,629,116 | 12/1971 | Gartner et al. | 252/62 |
| 3,869,334 | 3/1975 | Hughes et al. | 252/62 |
| 4,327,065 | 4/1982 | von Dardel et al. | 423/338 |
| 4,402,927 | 9/1983 | von Dardel et al. | 423/335 |
| 4,432,956 | 2/1984 | Zarzycki et al. | 423/338 |
| 4,447,345 | 5/1984 | Kummermehr et al. | 252/62 |
| 4,610,863 | 9/1986 | Tewari et al. | 423/338 |
| 4,667,417 | 5/1987 | Graser et al. | 34/9 |
| 4,911,775 | 3/1990 | Kuma et al. | 156/208 |

FOREIGN PATENT DOCUMENTS

| | | |
|---|---|---|
| 0018955 | 11/1980 | European Pat. Off. |
| 0382310 | 8/1990 | European Pat. Off. |
| 3844003 | 3/1990 | Fed. Rep. of Germany |
| 2141418 | 12/1984 | United Kingdom |

OTHER PUBLICATIONS

Aerogels; Jochen Fricke; Scientific American; May 1988; pp. 92–97.
Fibre Reinforce Glass and Ceramic Composites; A. R. Hyde; GEC Journal of Research, vol. 6; 1; 1988; pp. 44–49.
Aerogels and Related Porous Materials; H. D. Gesser et al; Chem. Rev.; 89; 1989; pp. 765–788.
Status of Continuous Fiber-Reinforced Ceramic Matrix Composite Processing Technology; J. R. Strife et al; Ceram. Eng. Sci. Proc.; 11[7–8]; 1990; pp. 871–919.
Fabrication of Particulate, Platelet, Whisker and Continuous Fibre Reinforced Glass, Glass Ceramic and Ceramic Materials; A. R. Hyde et al; Br. Ceram. Proc.; 45; (Fabr. Technol.); 1989; pp. 221–227.
Aerogels, a Source of Adsorbents, Insulators, Catalysts and Ceramics; S. J. Teichner; Revue de Physique Appliquee; Colloque C4; Supplement au n°4; Tome 24; Avril 1989; pp. C4-1 through C4-6.
Advanced Composites for High Temperatures (A Study on a Suitable Fabrication Process); E. Fitzer et al; Metals Materials and Processes; vol. 2; No. 3; 1990; pp. 179–200.

*Primary Examiner*—James J. Bell
*Attorney, Agent, or Firm*—Klaus H. Wiesmann

[57] ABSTRACT

An aerogel matrix composite of a bulk aerogel and fibers dispersed within the bulk aerogel, and a method for preparing the aerogel matrix composite having the steps: Making a first solution by mixing a metal alkoxide with an alcohol; making a second solution by mixing an alcohol, water, and base; mixing the first and second solutions to form a third solution and mixing fibers therewith; aging the third solution containing the fibers to obtain a gelled composition; completely submerging the gelled composition in a liquid suitable for supercritical drying; heating and pressurizing the gelled composition at a rate between about 75° C. per hour to about 500° C. per hour until at least the critical temperature and pressure of at least the major liquid in the gel composition are reached; maintaining at least the critical temperature and pressure for a time sufficient to transform the liquid to a supercritical fluid; and reducing the pressure and temperature to ambient conditions by reducing the pressure at a rate above 500 psi per hour, and maintaining temperature above at least the critical temperature until the critical pressure transition is passed.

23 Claims, 4 Drawing Sheets

AEROGEL MATRIX COMPOSITES

This application is a continuation-in-part of copending application Ser. No. 07/761,577, filed Sep. 18, 1991, now abandoned the disclosure of which is incorporated by reference as if completely rewritten herein.

FIELD OF THE INVENTION

This invention relates to the preparation and application of aerogel matrix composites with improved handleability at the gel and aerogel stage, greater range of flexibility, comparable thermal insulation, and other improvements in aerogel properties. The invention provides for process conditions that allow the preparation of aerogels at a much faster rate than previously possible. The invention has utility in various kinds of thermal insulation and acoustic insulation applications. Examples of these applications include insulation for refrigeration, appliance, floor, wall and home, airplane body, boats and other marine equipment, and electrical equipment. The same concept of composition and processing is applicable in gas filtration membranes, catalytic supports, and in other applications where nontransparent materials can be used.

BACKGROUND AND RELATED ART

Escalating energy costs have lead to increased efforts in exploring more effective insulation materials for windows, houses, water heaters, as well as other appliances and equipment. In recent years, aerogels have been suggested as prospective insulation materials for these applications. Aerogels are a unique class of ultra-low-density (0.1–0.2 g/cc) materials with 90–99 percent porosity; the high porosity, intrinsic pore structure, and low density makes aerogels extremely valuable materials for these applications. Conventional aerogel preparation techniques involve the preparation of a gel that is subsequently dried under supercritical conditions. Monolithic aerogels prepared using these techniques disclosed in the literature are fragile and the preparation process involves complex time-consuming steps.

Alternatively, aerogel powder-fiber compacts (APFC) have also been suggested as prospective thermal insulation materials. APFCs are prepared by a process involving the prefabrication of several ingredients (aerogel powder, fibers, binders), which are later mixed together and compacted to form insulation boards or cloths. The preparation of APFCs, however, requires large amounts of aerogel powder and involves a significant number of steps in the fabrication process. Additionally, the insulating properties of the typical APFCs disclosed previously are inferior to those of the fragile, monolithic aerogels.

Related U.S. Pat. Nos. include: 2,808,338; 2,945,817; 3,629,116; 3,869,334; 4,402,927; 4,447,345; and 4,610,863. Related European patents include: EP 018,955 (1980) and EP 382,310 (1990). British patent application 2,141,418 discloses a process for the production of carbon containing materials having ultrafine grains. The patent further discloses producing a very dense body containing carbon by placing carbon fibers in a silica aerogel and chemically depositing carbon in the vapor phase into the silica aerogel to form a dense body with high thermal conductivity.

BRIEF DESCRIPTION OF THE INVENTION

The invention deals with inorganic aerogel matrix composites (AMCs) that have enhanced strength, decreased sensitivity to moisture, good thermal insulation values, and rigidity or flexibility based on the required application, and no volume shrinkage during supercritical drying. These desirable characteristics are obtained through formulation modifications and processing improvements such as molding, processing, and handling techniques. The invention also includes a reduction in process time, which is considerably shorter compared to the prior art, making the process more viable for commercial applications.

A general embodiment of a method for preparing an aerogel matrix composite typically comprises preparing an aerogel precursor; mixing fibers with the aerogel precursor; aging the aerogel precursor containing the fibers to obtain a gelled composition; completely submerging the gelled composition in a liquid suitable for supercritical drying; heating and pressurizing the gelled composition at a rate between about 75° C. per hour to about 500° C. per hour until at least the critical temperature and pressure of a liquid in the gel composition are reached; maintaining at least the critical temperature and pressure for a time sufficient to transform the liquid to a supercritical fluid; and reducing the pressure and temperature to ambient conditions by reducing the pressure at a rate above 500 psi per hour, and maintaining the temperature above at least the critical temperature until the critical pressure transition is passed. In one typical embodiment the fibers are selected to have a thermal conductivity less than about 1.0 W/m°K. The typical aerogel matrix composite formed is substantially crack free, having substantially no volume shrinkage, where the volume shrinkage less than about 1 percent. The heating rate may be above 50° C. per hour to about 150° C. per hour, to 500° C. per hour. In another embodiment the pressurizing includes pressurizing above ambient pressure prior to applying heat, and the pressurizing may be above about 400 psig prior to applying heat. A monolithic aerogel matrix composite is typically formed by the above method.

Another typical embodiment of the method for preparing an aerogel matrix composite comprises making a first solution by mixing a metal alkoxide with an alcohol; making a second solution by mixing an alcohol, water, and base; mixing the first and second solutions to form a third solution and mixing fibers therewith; aging the third solution containing the fibers to obtain a gelled composition; completely submerging the gelled composition in a liquid suitable for supercritical drying; heating and pressurizing the gelled composition at a rate between about 75° C. per hour to about 500° C. per hour until at least the critical temperature and pressure of at least a major liquid in the gel composition are reached; maintaining at least the critical temperature and pressure for a time sufficient to transform the liquid to a supercritical fluid; and reducing the pressure and temperature to ambient conditions by reducing the pressure at a rate above 500 psi per hour, and maintaining temperature above at least the critical temperature until the critical pressure transition is passed. The alcohols may all be the same alcohols or different. The typical aerogel matrix composite formed is substantially crack free, having substantially no volume shrinkage, where the volume shrinkage less than about 1 percent. The heating rate may be above 50° C. per hour to about 150° C. per hour, to 500° C. per hour. In another embodiment the pressurizing includes pressurizing above ambient pressure prior to applying heat, and the pressurizing may be above about 400 psig prior to applying heat. A monolithic aerogel matrix composite is typically formed by the above method. In another embodiment the method comprises the steps where: (1) in the first solution the metal alkoxide is $Si(OCH_3)_4$ and the alcohol is methyl alcohol; (2) in the second solution the alcohol is methyl alcohol and the base is ammonia; and (3) the submerging liquid is methyl alcohol.

In another typical embodiment an aerogel matrix composite is formed that comprises: a monolithic aerogel; and fibers dispersed within the monolithic aerogel. The fibers may be randomly distributed throughout the monolithic aerogel or in the form of a mat or sheet, or a plurality of mats or sheets. The fibers preferably have a thermal conductivity of less than 1.0 W/m°K. The aerogel matrix composite is substantially crack free with substantially no volume shrinkage. The volume shrinkage is less than about 1 percent.

DETAILED DESCRIPTION OF THE INVENTION

Figure 1:
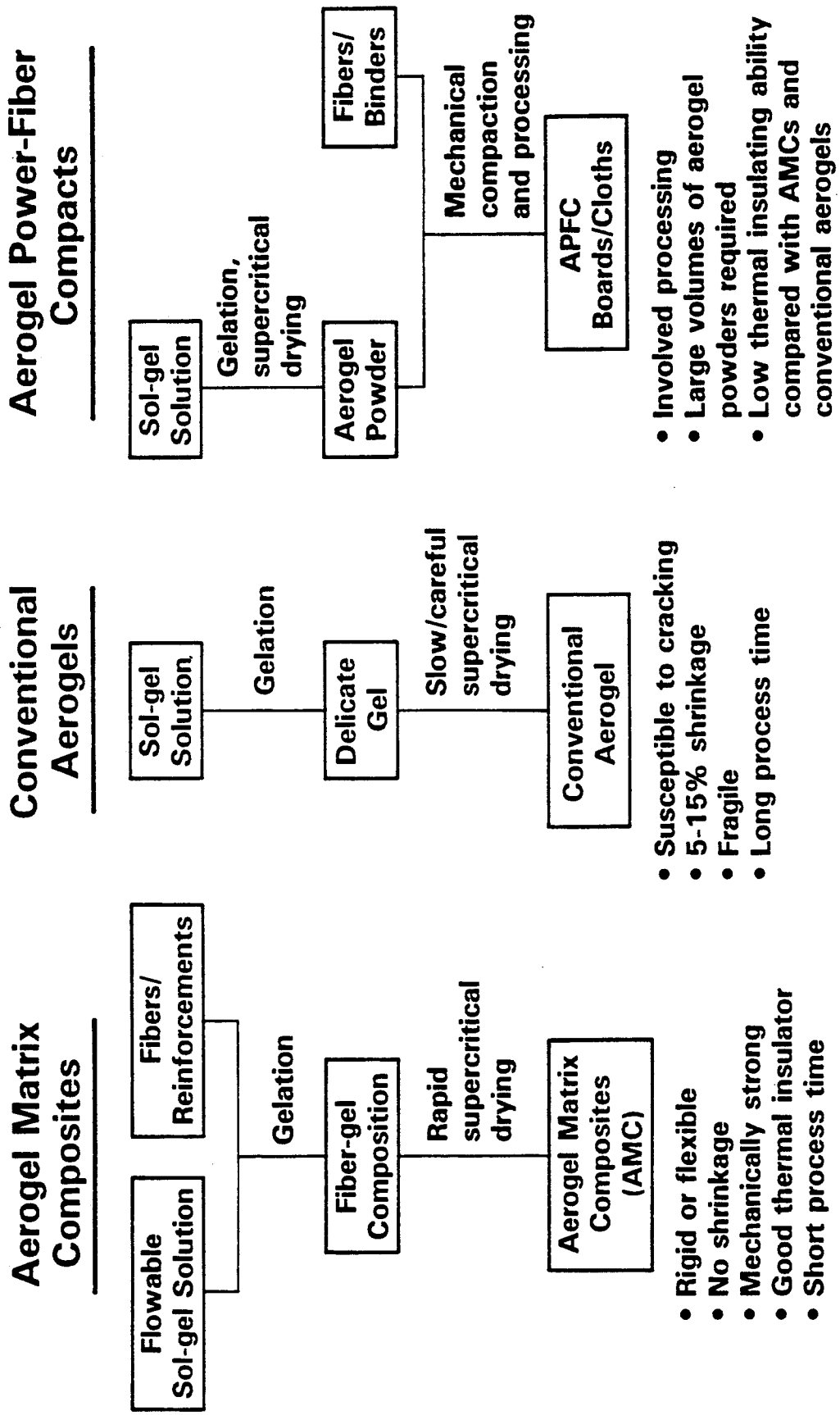
FIG. 1 is a schematic that illustrates the salient features and major differences between the processing route described in this invention for aerogel matrix composites (AMCs) and those disclosed in the prior art for conventional aerogels and aerogel powder-fiber compacts (APFCs).

The high porosities and low bulk densities of aerogels make them potentially very effective insulation materials, with reported thermal conductivities of monolithic aerogels on the order of 0.02 W/m°K. at ambient pressure in air. However, monolithic aerogels are extremely fragile and have low elasticities, consequently limiting their utility in insulation and most other applications. Similarly, APFCs also require involved fabrication and the resultant materials have relatively low thermal insulation values compared with monolithic aerogels.

To overcome these drawbacks, aerogel matrix composites (AMCs) with a variety of unique characteristics have been prepared. The AMCs consist of a bulk or monolith aerogel matrix prepared by supercritical drying of a gel with a fiber-type reinforcement. As used herein monolithic aerogel has the same meaning as bulk aerogel to define an aerogel produced as a monolithic structure directly from a gel, and not produced from an aerogel powder -or other similar discreet aerogel material that is later processed by compression and/or heat to produce a larger aerogel structure. The aerogel matrix can be comprised of $TiO_2$, $SiO_2$, $ZrO_2$, and other similar sol-gel oxides and their composites. These sol-gel matrices could also include any of the above oxides plus CuO, NiO, $Fe_2O_3$, ZnO, or metals for catalytic applications. To enhance the mechanical properties of these sol-gel derived monolithic aerogels, the gel matrices were reinforced with long or short fibers of varying thicknesses, whiskers, mineral wool, glass wool, and particles. The composition of the reinforcing material may include oxides such as $SiO_2$ and $Al_2O_3$ (fibers, whiskers, and wools) and carbon, metals, and a variety of oxides (particles). These reinforcements also provide opacification to the radiative heat flow. In addition to these reinforcements, pigments like $TiO_2$ can also be added to AMCs for further opacification. The fibers preferably have a thermal conductivity of less than about 1.0 W/m°K. and most preferably less than 0.5 W/m°K. These conductivities will provide for the desired reduction in heat flow while simultaneously providing structural support. By utilizing fibers having low thermal conductivity the insulating properties of the aerogel are maintained. Examples of preferred fibers are glass wool ($k=4.2\times 10^{-2}$ W/m°k.), rock wool ($k=3.7\times 10^{-2}$ W/m°k.) . The length of the fibers may be any that provides the desired properties. Thus, fibers between 25 microns to several inches in length may be used. Longer fibers as well as long fibers running the length of the aerogel or having no termination within the aerogel may be used. The fibers may be randomly distributed or oriented. They may also be in the form of individual fibers, bundles of fibers, mats or sheets, woven or unwoven, as needed in the particular application.

The following general procedure is representative of the invention. Fiber-gel compositions are prepared and transferred to an autoclave, where they were submerged in the minimum required volume of the corresponding liquids used for the process. The samples are pressurized to 200-1500 psi (1.38-10.3 MPa) at room temperature with an inert gas. Gases such as nitrogen gas and the like may be used. Then the temperature is raised at 50°-500° C. per hour, preferably above 75° C. per hour, and most preferably above 100° C. per hour. This temperature increase is accompanied by an increase in the autoclave pressure that can also be at a rate of 200-1500 psi (1.38-10.3 MPa) per hour and preferably above 500 psi (3.43 MPa) per hour. Higher rates of heating and pressurizing are preferred and are possible in these samples as compared with the prior art because of the presence of fibers in the gel composition. The gel stabilization method thus provides substantial increase in the mechanical strength of the composite gels, allowing them to resist cracking during gelation, and disintegration and shrinkage even at the faster heating and pressurizing processes used during supercritical drying. To maintain a desired maximum autoclave pressure, fluid vapors can be bled off as the pressure increases with heating. The final temperature and the pressure in the autoclave vessel is held between 245°-275° C. and 1400-2500 psi (9.66-17.25 MPa), respectively. After keeping the gels above the critical point of the liquid for a SCD time of 15 minutes to 2 hours, the pressure is released at a rate of 500-2000 psi (3.45- 13.75 MPa) per hour, while maintaining the temperature above the critical point of the liquid. The material is then cooled to room temperature. The liquid vapors contained in the compressed volume of the autoclave can be condensed and collected for reuse as the system is depressurized. Higher rates of cooling and depressurizing are preferred and are possible in these samples as compared with the prior art because of the presence of fibers in the gel composition. The gel stabilization method provides a substantial increase in the mechanical strength of the composite gels, allowing them to resist cracking during cooling, and disintegration and shrinkage even at the faster cooling and depressurizing rates. The supercritical drying processes can be successfully completed within a short duration particularly when the higher ranges of heating, pressurizing, cooling, and depressurizing are used. This provides a substantial improvement over previous processes when a substantially crack-free monolith is desired.

More specifically, the oxide matrix gels can be prepared from their corresponding alkoxides (e.g. Si-$(OCH_3)_4$, $Si(OC_2H_5)_4$, $Ti(O-OC_3H_7)_4$, $Zr(OC_3H_7)_4$) in alcohol. The alkoxides can be hydrolyzed with additives such as HCl, $HNO_3$, HF, $CH_3COOH$, $NH_4OH$, NaOH, KOH, and other organic acids and bases (e.g. $(C_2H_5)_3N$) and reinforced with fibers, etc. while in the flowable state. As the polymerization process proceeds the solution hardens into a fiber-gel composition. The fiber-gels are placed in an autoclave and submerged within the corresponding alcohol (e.g. methyl, ethyl, isopropyl alcohols). The vessel is then pressurized to 100–1500 psi (0.7–10.3 MPa) at room temperature and then the temperature is increased to 250°–260° C. The increase in temperature causes an increase in pressure to 1400–2300 psi (9.7–15.9 MPa). After holding the critical temperature and pressure for 15–60 minutes, alcohol is bled out slowly keeping the temperature above the critical point of alcohol. After the pressure is dropped down to 23 psi (0.2 MPa), the heat is turned off and the samples were removed. These conditions result in reducing the process time to 3–7 hours and less which is significantly less than the prior art processes.

FIG. 1 illustrates schematically the salient features of the processing route for the preparation of the AMCs, as well as the significant differences between this route and those disclosed previously for conventional aerogels and APFCs. Generally the materials used to make the aerogel are not limited to the specific starting material listed above but could also include inorganic salt, metal organic, organometallic and the like precursors of Si, Ti, Zr and other metals.

The resultant aerogel matrix composites were characterized by a Quantachrome Autosorb-1 BET instrument for surface area, porosity, and pore size distribution, by scanning electron microscopy for microstructure, by ASTM C518-85 method (Steady-state heat flux measurements and thermal transmission properties by Holometrix model Rapid-K heat flow meter) for thermal conductivities, and by Instron mechanical testing equipment for compressive strength, tensile strength, bend strength and elastic modulus. These results indicated that compared with conventional monolithic aerogels, the AMCs had a range of flexibility (rigid to flexible), improved mechanical properties, and increased solvent/moisture resistance without diminishing the thermal insulation properties.

As a result of these characteristics, AMC gels and aerogels are significantly easier to handle compared with conventional aerogels eliminating the need for special gel handling techniques. In addition to the improved mechanical properties of the AMCs, the process time for their fabrication has been considerably reduced to within 3–7 hours. Hence, these property and process improvements make AMCs more viable candidates for production and commercialization than monolithic aerogels.

In addition, AMCs exhibit better properties, such as thermal insulation and elastic modulus, than those disclosed for APFCs and require a comparatively simpler processing route. The advantages of the AMC processing route over the APFC process include a reduction in the number of steps involved in fabricating the final insulation material and in the amount of aerogel material needed per unit insulating volume.

Along with the above unique properties, AMCs have certain advantages over other existing insulation material including the fact that they are non-CFC materials (chloro-fluoro carbons, i.e. ozone depleting compounds), are nonflammable, are stable up to 500°–700° C. (beyond which sintering starts while maintaining the nonflammable character and no toxic fumes are produced at higher temperatures), have much longer life times then CFC blown polyurethane, insulation foams.

Similar to conventional aerogels, the thermal insulation values of AMCs are enhanced (2–3 times) as the pressure in the bag containing AMC is reduced to ⅓ or 1/10 of atmospheric pressure. Hence, the AMCs can be used under soft vacuum (0.1–0.2 atm) for applications requiring higher insulating properties. In contrast to conventional aerogels, however, AMCs are better thermal insulator at higher temperatures as shown by the modelling results in FIG. 4. In this figure T is the temperature in °K., Δk is the change in thermal conductivity in W/m°K., and ΔR is the change in R value. The R value scale is not linear and is given for reference only. With increasing temperature the contribution of the radiation factor to the heat flow increases. Hence, the opacification by fibers in AMCs becomes an increasingly important factor.

EXAMPLE 1-A

For the discussion below please refer to Tables I and II that illustrate various batches for this example. In the tables the following abbreviations are used P-pressure, T-temperature, SCD-supercritical drying, and V-volume.

TABLE I

| | Part A | | | |
|---|---|---|---|---|
| Material | Weight Percent Fibers | Percent Shrinkage | Density (g/cm$^3$) | Surface Area (m$^2$/g) |
| A[a] | 9 | <1 | 0.12 | 219 |
| B[a] | 12 | <1 | 0.11 | 203 |
| C[b] | 12 | <1 | 0.12 | 203 |
| D[a] | 16 | <1 | 0.12 | 182 |
| E[a] | 21 | <1 | 0.13 | 147 |
| F[c] | 0 | 5.15 | 0.05–0.15 | 500–800 |
| G[d] | 55 | Not Applicable | 0.35 | Not Available |

TABLE I

| | | Part B | | | |
|---|---|---|---|---|---|
| Material | k (W/m °K.) | R-value (hr·ft²·F/BTU·inch) | Elastic Modulus MPa (psi) | Bend Strength MPa (psi) | Porosity (%) |
| A[a] | 0.020 | 7.2 | 5.8(838) | 0.05(7) | 94.5 |
| B[a] | 0.021 | 7.0 | 6.9(1003) | 0.12(16.8) | 95.0 |
| C[b] | 0.018 | 8.0 | 15.4(2236) | 0.13(18.9) | 94.5 |
| D[a] | 0.019 | 7.3 | 15.2(2200) | 0.19(27.1) | 94.5 |
| E[a] | 0.019 | 7.3 | 93.4(13546) | 0.26(38.4) | 94.0 |
| F[c] | 0.018–0.021 | 7–8 | <2(<290) | not bendable | — |
| G[d] | 0.026 | 5.4 | 2.56(370) | 0.17(25.0) | — |

[a]Weaved
[b]Encased, sandwich sample in contrast to layered sample (see Example 1-A for details)
[c]Conventional aerogel (SiO₂ noncomposite)
[d]Aerogel powder-fiber compacts (APFCs) (averaged values)
[e]All of the samples were disks Rigid varieties of AMCs were prepared by supercritically drying a silicate sol-gel solution reinforced with varying loadings of pyrex glass wool (Corning SiO₂ fibers, 8 μm diameter). The silicate sol-gel solution was prepared based on the following equation:

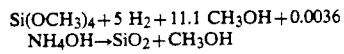

$$Si(OCH_3)_4 + 5\ H_2 + 11.1\ CH_3OH + 0.0036\ NH_4OH \rightarrow SiO_2 + CH_3OH$$

Solution A was made by mixing 30 parts (parts are defined as volume ratios) CH₃OH, 8.73 parts distilled H₂O, and 0.38 parts NH₄OH (29.3 weight percent in H₂O) solution. Solution B was prepared by mixing 15 parts CH₃OH and 14.73 parts Si(OCH₃)₄ (TMOS). Solution A was added to solution B and was stirred at room temperature resulting in a sol-gel solution that is flowable for a brief period following mixing. Silica fibers, cut to 4–6 inches (10.2–15.2 cm) in length, were laid in a thin layer in a silicone rubberized mold. Then a small amount of sol-gel solution was poured and a layer of silica fibers was overlaid at an angle of 90° to the earlier layer. The alternate layers of fibers and sol-gel solution resulted in a fiber-gel composition with a weaved silica fiber mat (see Table I). In other cases (Table I), fiber-gel compositions consisting of a gel contained between top and bottom layers of fiber mats were prepared. In some AMC samples, ready-made fiber mats were used as facers on the surface of the reinforced samples. In still other samples, vertical (to the sample thickness) and random orientations of the fibers in the gel were also prepared. The silicate solution in the samples hardened into gel in less than 2 minutes. The fiber-gel samples were prepared in various dimensions and shapes. The most common examples included 6 to 7 inch (15.2–17.8 cm) discs with 0.5 to 1 inch (1.27–2.54 cm) thickness (Samples Table I-A to E) and 12 inch×12 inch×1 inch (30.5×30.5×2.5 cm) tiles were prepared and tested with similar results. The fiber-gel compositions were handled very easily in contrast to conventional silica gels that are sensitive to extensive internal and external cracking from vibrations.

TABLE II

| | Part A | | | | |
|---|---|---|---|---|---|
| Sample Run | Initial P (psi) {MPa} | T. Ramp (°C./hr) | P. Ramp (psi/hr) {MPa/hr} | Max. P. (psi) {MPa} | Max. T (°C.) |
| R1 (repeated 5 times) | 650 {4.48} | 75 | 300 {2.07} | 1500 {10.3} | 250 |
| R2 | 600 {4.14} | 130 | 1200 {8.28} | 1500 {10.3} | 255 |
| R3 | 600 {4.14} | 96 | 400 {2.76} | 2200 {15.17} | 252 |
| R4 | 600 {4.14} | 80 | 700 {4.83} | 2300 {15.86} | 260 |
| R5 | 600 {4.14} | 125 | 900 {6.21} | 2300 {15.86} | 260 |
| R6 | 1200 {8.28} | 75 | 500 {3.45} | 2000 {13.79} | 255 |

TABLE II

| | Part B | | | |
|---|---|---|---|---|
| Sample Run | SCD Time (hr) | P. Release (psi/hr) {MPa/hr} | Liq. V. Release (L/hr) | Total Time (hr) |
| R1 (repeated 5 times) | 0.5 | 1500 {10.3} | 3–12 | 5.3 |
| R2 | 0.5 | 1200 {8.28} | 10 | 3.6 |
| R3 | 1 | 900 {6.21} | — | 7.7 |
| R4 | 1 | 1400 {9.66} | — | 4.8 |
| R5 | 1 | 1600 {11.03} | — | 4.6 |
| R6 | 1 | 700 {4.83} | — | 6.0 |

Referring now to Table II-Parts A and B the following procedure was used to obtain the materials. The fiber-gel compositions were removed from the molds and transferred to an autoclave, where they were submerged in the minimum required volume of the corresponding alcohols within liners/containers. The samples were pressurized to 600–1200 psi (4.1–8.3 MPa) at room temperature with nitrogen gas. Then the temperature was raised at 75°–130° C. per hour. This temperature increase was accompanied by an increase in the autoclave pressure at a rate of 500–1200 psi(3.4–8.28 MPa) per hour. Higher rates of heating and pressurizing were possible in these samples as compared with the prior art because of the presence of fibers in the gel composition. The gel stabilization method thus provides substantial increase in the mechanical strength of the composite gels, allowing them to resist cracking during gelation, and disintegration and shrinkage even at the faster heating and pressurizing processes used during supercritical drying. To maintain a desired maximum autoclave pressure, methanol and nitrogen vapors were bled off as the pressure increased with heating. The final temperature and the pressure in the autoclave vessel was held between 250°-260° C. and 1500-2300 psi (10.3-15.9 Ma), respectively. After keeping the gels above the critical point of methanol for SCD time 30 minutes to 1 hour, the pressure was released at a rate of 700-1500 psi (4.83-10.3 MPa) per hour, while maintaining the temperature above the critical point of methanol. The methanol vapors contained in the compressed volume of the autoclave were condensed and collected for reuse at a rate of 3-12 L/hr. as the system was depressurized. The supercritical drying processes were successfully completed within a duration of 3-7 hours. This is a substantial improvement over previous processes where 24 hours to 20 days of curing and processing are required to prepare a substantially crack-free monolith.

The fiber-gel compositions can also be dried by using $CO_2$ or other compatible supercritical fluids by exchanging the alcohol with the selected fluid and using the corresponding critical temperature and pressure of this fluid above their critical points. The samples (Samples A to E in Table I) prepared by alcohol supercritical drying did not require curing at an elevated temperature after the drying process. In comparison, samples where alcohol was first exchanged with liquid $CO_2$ and then dried at the critical temperature and pressure of $CO_2$ required curing at higher temperatures (250°-500° C). The alcohol supercritical drying process resulted in more robust aerogels with significantly shorter processing time as compared with the $CO_2$ exchange and drying process. With increased sample thicknesses the exchange and drying process using liquid $CO_2$ was substantially more time-consuming.

The samples (Samples A to E) thus formed were about 6 inches (15.2 cm) in diameter and about 0.5 inches (1.3 cm) in thickness. The rigid AMCs showed very little (<1 percent) or no volume shrinkage in the transformation from the gel to the solid state. In contrast, conventional aerogels made from nonreinforced gels exhibit between 5-15 percent volume shrinkage. The bulk densities of the AMCs varied between 0.11-0.14 g/cc, surface areas were between 120-400 $m^2/g$, and porosities were in the range of 92-96 to 94-95 percent. The low densities and high porosities of AMCs result from no volume shrinkage during the drying process due to the presence of fibers in the fiber-gel compositions. The AMC samples had good thermal insulation properties, with thermal conductivities ranging from 0.014 and 0.021 W/m°K. These thermal conductivities are equivalent to 0.125 and 0.143 BTU-.inch/hr.ft$^2$.°F. with R values in the range of 7-8 per inch. The mechanical properties of the aerogel matrix composites were determined to be a substantial improvement over conventional aerogels prepared from nonreinforced gels. In particular, the elastic modulus of these samples ranged between 800-14,000 psi (5.5-96.5 MPa).

EXAMPLE 1-B

Figure 2:
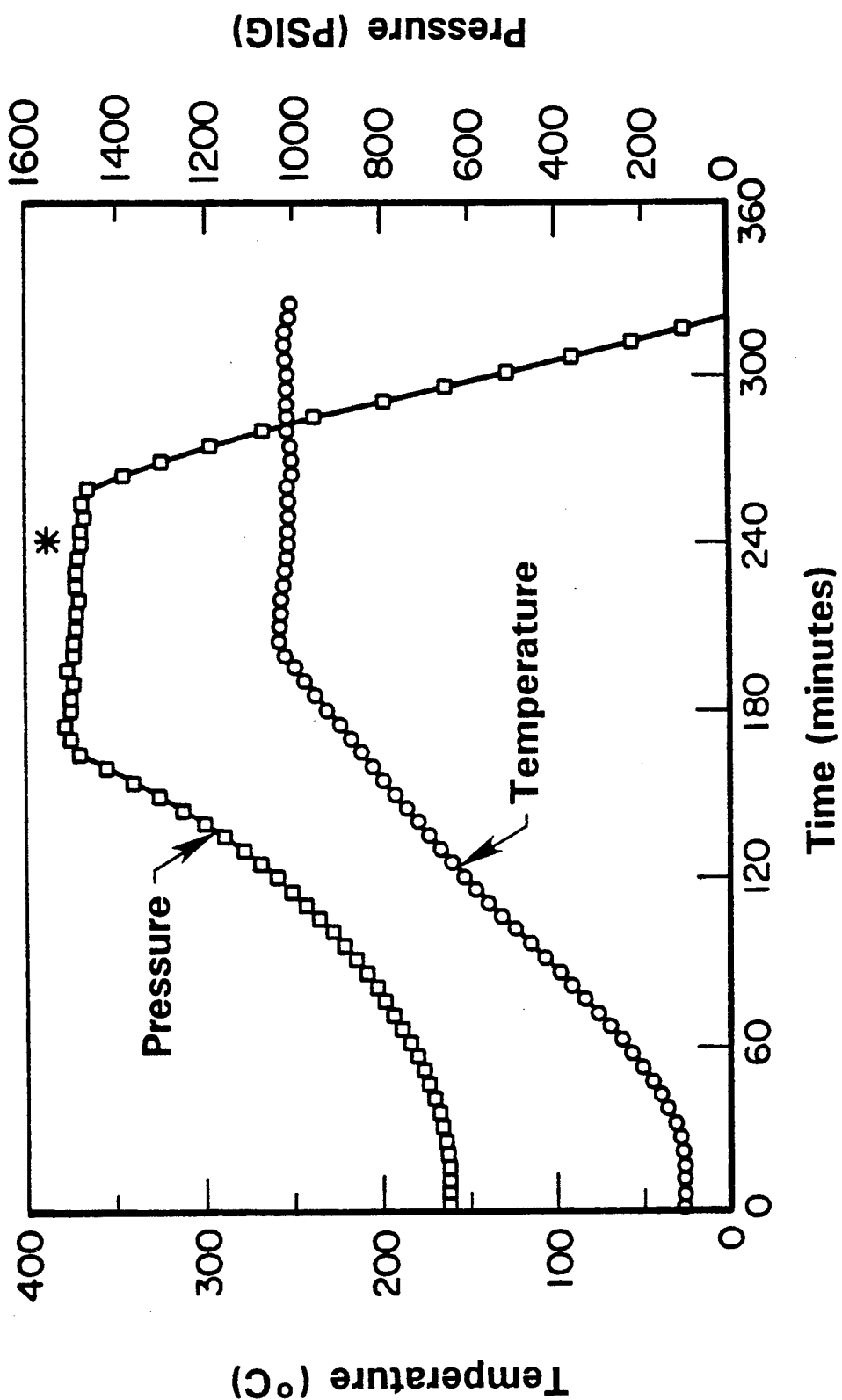
FIG. 2 is a graph that shows reactor temperature, T, in ° C. (left hand ordinate) and pressure, P, in psig (right hand ordinate) plotted versus time, t, in minutes (abscissa) for a typical batch processing run of an aerogel matrix composite. The asterisk in the figure refers to the point in the run at which the reactor depressurization was begun.

Details and results of one specific batch of experiments using the above procedure are disclosed below:

Fiber-stabilized $SiO_2$-methanol gels were prepared using the procedure outlined earlier in this example. Fiber-gel compositions containing fiber weight percents ranging from 9-21 percent (in the AMCs) were prepared and supercritical drying conditions shown in FIG. 2 were employed. Referring now to FIG. 2, reactor temperature, T, in °C. (left hand ordinate) and pressure, P, in psig (right hand ordinate) are plotted versus time, t, in minutes (abscissa) for batch processing of an aerogel. Conditions were as follows: Temperature 250° C., pressure 1500 psig (10.3 MPa) maximum, depressurization beginning at 240 minutes, and total run time of 5 hours and 8 minutes. As indicated in FIG. 2, the autoclave temperature increased at a rate of approximately 100° C. per hour, and the pressure increased at a rate of approximately 500 psi (3.5 MPa) per hour. Supercritical conditions of 1450-1500 psi (10-10.3 MPa) and 250°-260° C. were maintained for 1 hour. The autoclave was depressurized at about 1400-1500 psi (9.7-10.3 MPa) per hour, with the temperature maintained between 250°-260° C. The test run was thus processed within a total duration of about 5 hours. It is apparent that this time can be reduced.

The properties of the AMCs produced from this batch are given in Table I-Parts A and B including the volume shrinkage, bulk densities, surface areas, thermal conductivities, R values, bend strengths, and elastic moduli.

Table I-Part A shows that the AMCs prepared by the procedure disclosed had little (<1 percent) or essentially no volume shrinkage from the gel to the AMC. This useful result arises from the stabilizing presence of fibers in the gel state before and during the supercritical drying process. The bulk densities of these AMCs ranged from 0.11-0.13 g/cc. These densities are comparable to those of conventional aerogels and result from the minimal volume changes introduced by the addition of fibers to gel volume. Table I also shows the range of surface areas of the various AMCs measured by the BET method. The surface areas were found to decrease with an increase in weight percent fibers in the AMC, as the fibers added have low surface area of <1 $m^2/g$. However, the AMCs still have very high surface areas suitable for a variety of applications.

Referring now to Table I-Part B the thermal conductivities k, where k is in W/m°K., and R values of the AMCs prepared were measured to be between 0.018-0.021 W/m°K. and 7-8 per inch, respectively. The increase in weight percent of silica fibers with R values of 3 per inch in the AMCs (from 9.0 percent to 21.0 percent) did not decrease the thermal insulation values (R values) of the AMCs. When the weight percent of fibers changed from 8 to 21 percent the percent volume changes were minimal (i.e. 0.4 to 1.24 percent). Since most of the AMC was still composed of aerogel material, the change in thermal insulation value was negligible. Similarly, the orientation of the fibers in the AMC did not affect thermal conductivities. This study indicates that rigid and flexible AMCs will have comparable or similar R values, even though flexible AMCs may contain larger amounts of silica fiber (>35 percent, see Example 2) as compared to rigid AMCs (<25 percent). This observation opens up a wide range of applications for both rigid and flexible AMCs.

Figure 3:
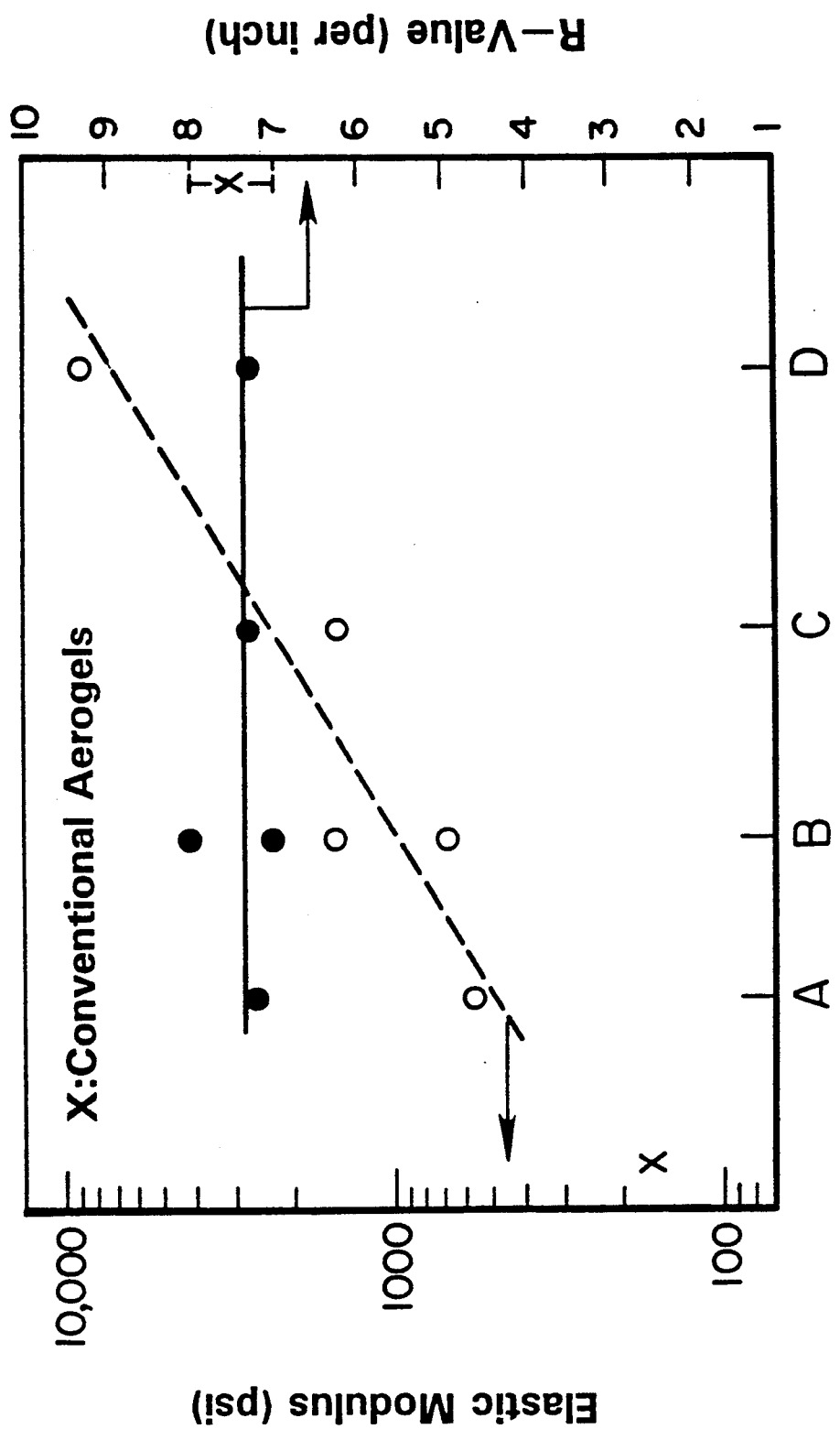
FIG. 3 is a graph showing a plot (white dots) of elastic modulus, E, in psi (left hand ordinate) and a plot (black dots) of R-value (right hand ordinate) for a set of AMC samples (A,B,C,D) produced from the process described in FIG. 1. The samples A,B,C,D are described in Table I and accompanying text.

Table I-Part B shows the improvement in the mechanical properties of these AMCs with increase in weight percent fiber. As the weight percent fibers increased from 9 percent to 21 percent the elastic moduli increased exponentially from 838 to 13,546 psi (5.8-93.4 MPa). These data are shown graphically in FIG. 3. FIG. 3 is a graph showing a plot (white dots) of elastic modulus, E, in psi (left hand ordinate) and a plot (black dots) R-value (right hand ordinate) versus weight percent fibers W (abscissa). Values for conventional aerogels are represented by an X. The substantial improvement in the mechanical properties with increasing weight percent fibers provides additional opportunities for rigid and flexible AMCs with no loss in the thermal insulation abilities of the materials.

The effect of compressive load on the thermal insulation values of AMCs was also investigated. The R value of an AMC infiltrated with 12 weight percent silica fiber was determined to be 7.3 per inch. This sample was compressed at 27–28 psi (approximately 0.19 MPa) pressure such that the disc thickness decreased from 0.62" to 0.5" (1.57 cm to 1.27 cm). After the loads were removed the sample sprang back to almost the same original thickness of approximately 0.61" (1.55 cm). The R value of this compressed sample was measured again and was found to be unchanged by the compressive load episodic test. This indicates that even after some mechanical damage to the composite, the R value is retained and the structure remains largely intact.

As indicated in Table I-Part B, gels sandwiched between fiber mat layers (Sample C) did not show any change in R values compared with layered fiber-gel compositions (Sample B). However, the elastic modulus of the sandwich structure increased to 15.4 MPa (Sample C) from 6.9 MPa (Sample B). This indicates that certain fiber-gel composition geometries might be preferable over others.

In Table I the properties of conventional aerogels with no fibers, and aerogel powder-fiber compacts (APFC) from the prior art are given for comparison purposes. In comparing the properties of the materials given in Table I, it is evident that the AMCs disclosed here are mechanically superior to the fragile, monolithic conventional silica aerogels. Thermal conductivity modeling analysis indicates that all AMC samples would have relatively lower thermal conductivity compared to conventional aerogels at temperatures higher than 26° C. (See FIG. 4).

Figure 4:
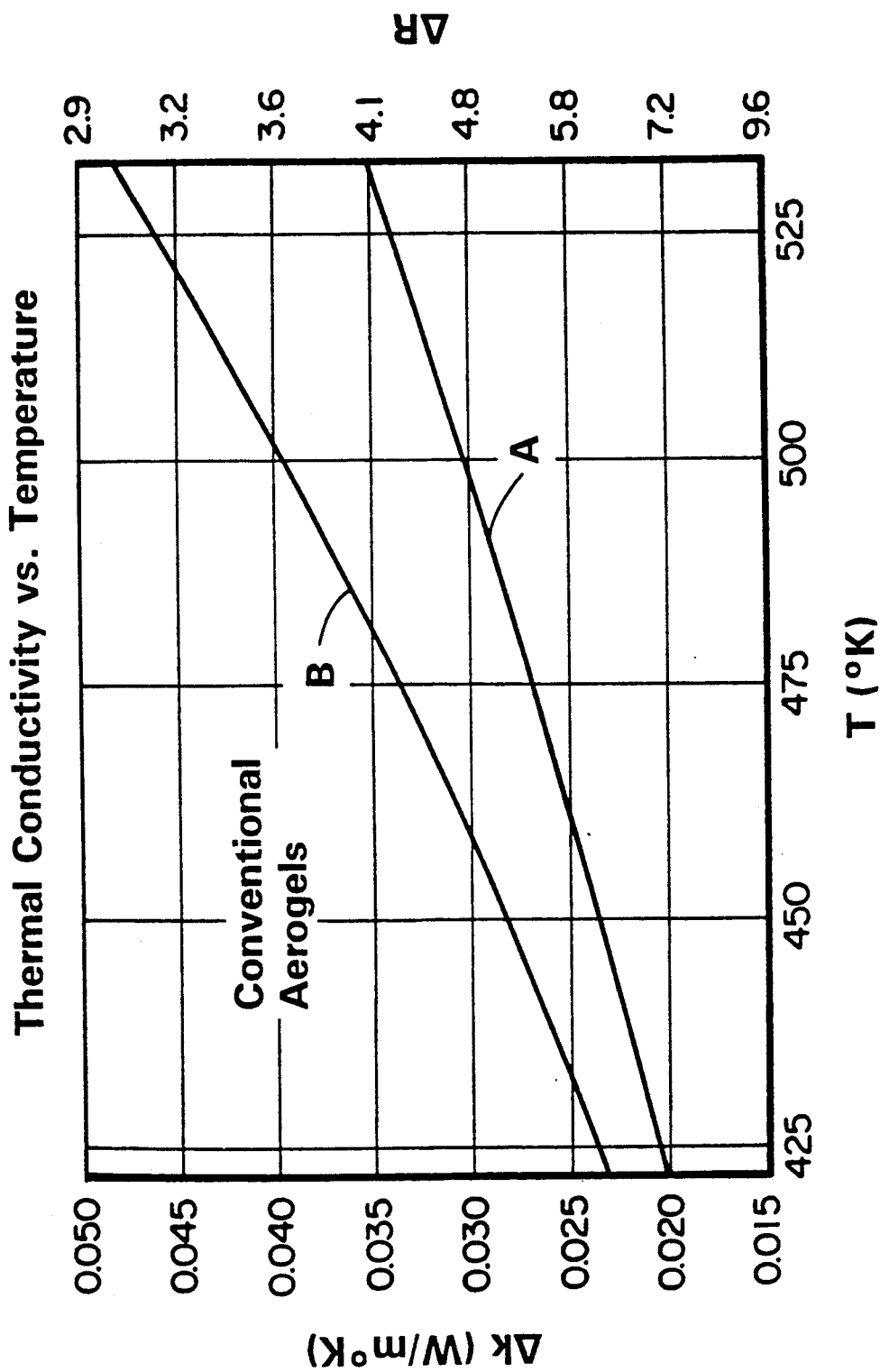
FIG. 4 is a comparison between the thermal conductivity of AMCs of the present invention (A) and conventional aerogels (B) at temperatures higher than 26° C. In the figure, T is the temperature in °K., $\Delta k$ is the change in thermal conductivity in W/m°K., and $\Delta R$ is the change in R value. The R value scale is not linear and is given for reference only.

FIG. 4 is a comparison between the thermal conductivity of AMCs of the present invention (A) and conventional aerogels (B) at temperatures higher than 26° C. In the figure, T is the temperature in °K., $\Delta k$ is the change in thermal conductivity in W/m°K., and $\Delta R$ is the change in R value. The R value scale is not linear and is given for reference only. At higher temperatures, the radiative heat flow contribution to the conductivity increases. The lower conductivity of AMCs at high temperatures can be explained by the opacitying effect of fiber reinforcements to the radiative heat flow. Further, the AMCs also have better thermal insulation values and elastic moduli compared with aerogel powder-fiber compacts. Additionally, AMCs can be prepared with relatively smaller amounts of raw material and significantly fewer fabrication steps compared with APFCs.

Thus, the set of experiments described above demonstrate that due to the introduction of fiber reinforcements in the gels prior to supercritical drying the resultant AMCs are prepared with substantial elimination of shrinkage and cracking during gelation and drying even when very high temperature and pressure gradients are utilized for supercritical drying. This results in a significantly shortened fabrication process compared with the prior art, making it more suitable for large scale production. The substantial improvements in the properties of the AMCs over those of conventional aerogels and APFCs, such as no volume shrinkage, high mechanical strength and comparable or higher thermal insulation properties, provides a wide range of application opportunities infeasible thus far. These types of AMCs can be produced with 0.04–0.25 g/cc densities with a variety of reinforcement loadings, consequently changing the mechanical properties. To further improve the thermal insulation values the AMCs can be wrapped or packaged in metallized sheets to reduce radiative heat flow through the sample and/or placed under soft vacuum (0.1–0.2 atm).

EXAMPLE 2

A flexible AMC was prepared where the aerogel structure was modified by adding silica fiber reinforcements to the silicate sol-gel solution. The silicate sol-gel solution was prepared in manner described in Example 1. In some cases, in order to slow down the gelation process, approximately 15 parts of $CH_3OH$ was further added to the infiltrated silica fibers or only ¼ of the $NH_4OH$ in Example 1 was added. The trapped silica gel in the silica fiber matrix hardened in 5–10 minutes. The silica fiber mat/sheet was rolled up in a cylindrical shape and submerged in minimum methanol. It was then transferred to a vessel for supercritical drying purposes above the critical point of methanol. The drying procedure required about 250° C. temperature and about 1500 psi (10.3 MPa) pressure (see Example 1 for details of the procedure).

The same material was also prepared by using $CO_2$ super critical drying where methanol was first exchanged with liquid $CO_2$. Then the gel was dried at 40° C. and 1150 psi (7.9 MPa). Later, the dried gel was heated at 450° C. to remove any residual organic or hydroxy groups present in the aerogel. The drying process using $CO_2$ required 1–2 days.

The dimensions of the silica fiber mat used in these experiments were approximately 5"×6"×0.25" (12.7×15.2×0.6 cm) and 12"×12"×0.5" (30.5×30.5×1.3 cm). The flexible AMCs contained 30–50 percent or 16–20 percent (using ridge mold) of silica fibers by weight. The surface area of the plain silica fiber matrix was measured to be <1 $m^2/g$ by BET method. On the other hand, the infiltrated silica fiber matrix indicated the BET surface area to be in the range of 100–400 $m^2/g$ (monolithic aerogels have typical BET surface areas in the range 500–800 $m^2/g$). The bulk densities of these infiltrated silica fiber samples were in the range of 0.09–0.13 g/cc. As observed by SEM (scanning electron microscopy) the porous spaces in the silica fiber matrix were almost completely filled by the infiltrated monolithic aerogel material.

Thermal property measurements, including thermal conductivity and thermal resistance were carried out for these materials. In addition, the heat capacity was also calculated from the differential scanning calorimetry (DSC) data. The thermal conductivity of the silica fiber infiltrated with silica aerogel were determined to be in the range of 0.018 to 0.020 W/m°K. This thermal conductivity value is equivalent to 0.125–0.142 BTU-.inch/hr.ft$^2$.F and R value of 7 to 8. For comparison, the thermal conductivities (also R values) of glass wool insulation and CFC-based polyurethane refrigeration insulation are 0.29 (R=3.44) and 0.142 BTU-.inch/hr.ft$^2$°F. (R=7), respectively. Hence, both rigid and flexible infiltrated aerogel insulations are significantly better than current fiber glass insulation and are at least as good as CFC-filled polyurethane foam insulation materials. Unlike CFC-polyurethane foams, however, the flexible AMCS would potentially retain these R values indefinitely.

EXAMPLE 3

Same as Example 1, but the long fiber reinforcements were replaced with shorter fibers or whiskers. Hence, the resultant AMCs were fiber or whisker reinforced. If these fibers/whiskers are dispersed under microgravity the fiber/whisker distribution in the aerogel matrix would be more uniform. The fibers are preferably about 5 to 200 um in diameter and the whiskers are preferably about 0.5 to 1.0 um in diameter and about 25 to about 100 um long. The fibers and whiskers are preferably inorganic oxides or metals.

EXAMPLE 4

The process of Example 1 was repeated but the fiber matrix was replaced by an alumina ceramic foam. The silicate solution penetrated the pores well and gelled in the pores. The gel was converted into an aerogel after supercritical drying.

EXAMPLE 5

The process of Example 1 is repeated but the fiber matrix is replaced by a honeycomb structure. The process of the invention combined with this type of structure provides extraordinary mechanical properties.

EXAMPLE 6

The process of Example 1 is repeated, however, the silicate gel is reinforced by particles prior to gelation and supercritical drying. These particles can be metal and inorganic powders.

EXAMPLES 7A and 7B

These examples are the same as Example 1, except that the formulations for silica aerogel were different. Since TMOS is not available in commercial quantities and is more expensive, a cheaper alternative was sought. For Example 7A this new composition involved tetraethoxy orthosilicate (TEOS) and methanol. Methanol was selected as a preferred alcohol based on the lower cost for commercial quantities. However, other alcohols such as ethanol can also be used. The procedure for preparing this gel can be described by these two reactions:

$$Si(OC_2H_5)_4 + H_2O + HCl + CH_3OH \longrightarrow$$

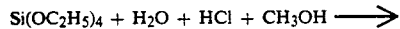

A (hydrolyzed silicon precursor)

$$A + NH_4OH + CH_3OH \longrightarrow Silica\ gel$$

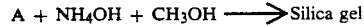

The molar ratio of $Si(OC_2H_5)_4:H_2O:HCl:NH_4OH:CH_3OH$ is equal to 1:3:0.0007:0.00124:3.75. In the first step only 1 mole of water/mole silicon was added along with methanol and HCl acid. This mixture was stirred and heated at 60° C. for 1 hour. In the second step a mixture of left over water and ammonia base was added at 0°-5° C. to slow down the condensation reaction. This gel was slightly cloudy as compared to TMOS gels. The bulk densities of the AMCs produced from TEOS/CH$_3$OH were found to be more dense (i.e. 1.1-1.8 times) than those of TMOS AMCs.

For Example 7B a similar silica gel were prepared using acetic acid and the reactions are represented below:

$$Si(OC_2H_5)_4 + H_2O + CH_3COOH + CH_3OH \longrightarrow$$

A (hydrolyzed silicon precursor)

$$A + NH_4OH + CH_3OH \longrightarrow Silica\ gel$$

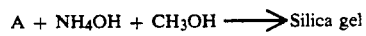

The molar ratios of $Si(OC_2H_5)_4:H_2O:CH_3COOH:NH_4OH:CH_3OH$ equal 1.00:10.09:0.39:0.01:16.82. In the first step only acetic acid, water and methanol were added to TEOS. This mixture was stirred and heated at 60° C. for 1 hour. In the second step, a mixture of ammonia base and methanol was added to the silicate solution. This gel was quite clear, though large volume shrinkage was observed for aerogels made by this method. Shrinkage could be reduced by optimizing the composition and the reaction conditions.

EXAMPLES 8A-8E

Same as Examples 2 through 6, except that the formulation for silica aerogel is different. Since TMOS is not available in commercial quantities and is more expensive, a cheaper alternative is preferred. This new composition involves tetraethoxy orthosilicate (TEOS) and methanol. Methanol is selected as a preferred alcohol based on the lower cost for commercial quantities. However, other alcohols such as ethanol can also be used. The procedure for preparing this gel can be described by the same reactions as in Example 7A. The molar ratio of $Si(OC_2H_5)_4:H_2O:HCl:NH_4OH:CH_3OH$ is equal to 1:3:0.0007:0.00124: 3.75. In the first step only 1 mole of water/mole silicon is added along with methanol and HCl acid. This mixture is stirred and heated at 60° C. for 1 hour. In the second step a mixture of left over water and ammonia base is added at 0°-5° C. to slow down the condensation reaction. This gel is slightly cloudy as compared to TMOS gels. This probably results from a higher degree of agglomeration, hence, scattering. The bulk densities of the AMCs produced from TEOS/CH$_3$OH should be more dense (i.e. 1.1-1.8 times) than those of TMOS AMCs.

EXAMPLES 9A-9E

Same as Examples 8A through 8E, except that a similar silica gel is prepared using acetic acid and the reactions are represented by the same equations as in Example 7B. The molar ratios of $Si(OC_2H_5)_4:H_2O:CH_3COOH:NH_4OH:CH_3OH$ equal 1.00:10.09: 0.39:0.01:16.82. In the first step only acetic acid, water and methanol are added to TEOS. This mixture is stirred and heated at 60° C. for 1 hour. In the second step, a mixture of ammonia base and methanol is added to the silicate solution. This gel is quite clear, though large volume shrinkage is expected for aerogels made by this method unless the composition and the reaction conditions are optimized.

EXAMPLE 10

Same as Example 1, except that the silica aerogel was made from aqueous sodium silicate solution. In preparing an aqueous silica gel, a solution of sodium silicate in distilled water was made such that the specific gravity of the solution is between 0.99-1.15 g/cc. To 60 ml aqueous sodium silicate solution, 10 ml of 10 weight percent HCl was added while stirring. This results in gelation within a few minutes to an hour. The gel was then supercritically dried as before. The liquid water in the first sol can be either first exchanged with alcohol then supercritically dried above the critical point of the alcohol or the water can be directly supercritically dried.

EXAMPLES 11-19

The method of Example 10 is repeated for Examples 2 through 9, except that the silica aerogel is made from aqueous sodium silicate solution.

EXAMPLES 20-25

Same as Examples 1 through 6, except that the aerogel composition is $ZrO_2$, $TiO_2$, $Al_2O_3$, and other similar oxides. These are prepared from their corresponding alkoxide precursors and alcohols. In systems like $ZrO_2$ and $Al_2O_3$ where agglomeration and precipitation is a common problem, acetyl acetone and other additives are added to prepare a homogeneous gel.

EXAMPLES 26-31

Same as Examples 1 through 6, but the silica aerogel is replaced by organic aerogels made from formaldehyde and resorcinol, or resorcinol and melamine. The preparation of these organic aerogels without gel reinforcement is described by Pekala et. al. in Mat. Res. Soc. Symp. Vol. 180, 791-795, 1990. The organic liquids are finally replaced with liquid $CO_2$ or other similar solvents for supercritical drying purposes. This composition results in organic aerogel-inorganic fiber composites.

EXAMPLES 32-36

Same as Examples 2 through 6, but the silica aerogel is replaced by organic-inorganic composite aerogels. These composite aerogels can be prepared by starting with TMOS where one or more alkoxide groups are replaced by inert organic groups. These inert organic groups include alkyl or aryl chains. On the other hand, if the organic group is reactive, simultaneous polymerization of inorganic and organic groups would result in an inorganic-organic composite. This type of composition introduces more flexibility into the composite due to the presence of organic moieties and polymers.

EXAMPLE 37

Same as Example 1, except that a surfactant (e.g. Tergitol XH) was added to the sol-gel solution to reduce the surface tension of the liquid. The reduced surface tension eased the liquid removal from the gel and improved the structural strength of the aerogel material.

EXAMPLES 38-72

Same as Examples 2 through 36, except that a surfactant (e.g. Tergitol XH) is added to the sol-gel solution to reduce the surface tension of the liquid. The reduced surface tension eases the liquid removal from the gel and improves the structural strength of the aerogel material.

EXAMPLE 73

Same as Example 1, except the monolithic AMC was made in the shape of a disc, and the thickness of the disc was less than 1 mm. Due to low pressure drop of the thin aerogel membrane samples and improved mechanical strength of AMCs these can be used as gas filtration/purification and separation media.

EXAMPLES 74-143

Same as Examples 2-72, except the monolithic AMC is made in the shape of a disc, and the thickness of the disc is less than 1 mm. Due to low pressure drop of the thin aerogel membrane samples and improved mechanical strength of AMCs these can be used as gas filtration/purification and separation media.

The disclosed AMCs have improved mechanical strength, relatively good moisture resistance, a range of flexibility, and good thermal resistance. The processes developed for these AMCs has been shortened to 3-7 hours and the solvent was totally recycled. The flexibility of this material makes it possible to easily replace insulation material for houses and for insulation in jacket form in applications up to 700° C. Apart from these applications the material can also replace the insulation material currently used in refrigerators. These foam materials are currently chloro-fluoro carbon blown polyurethane foams which are environmentally damaging, whereas, aerogels are environmentally safe and have extremely low thermal conductivities. Monolithic aerogels, for example, have thermal conductivities in the range of 0.01-0.02 W/m°K. as compared to the thermal conductivity of pyrex glass wool, 0.0418 W/m°K. The present system will provide a good combination of flexibility and thermal conductivities for insulation purposes. In addition, this system being an inorganic oxide, is also nonflammable. The other applications of this material may include packaging, comforters, and other thermally efficient apparel.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit or scope of the invention.

We claim:

1. A method for preparing an aerogel matrix composite comprising:
   a. preparing an aerogel precursor;
   b. mixing fibers with the aerogel precursor;
   c. aging the aerogel precursor containing the fibers to obtain a gelled composition;
   d. completely submerging the gelled composition in a liquid suitable for supercritical drying;
   e. heating and pressurizing the gelled composition at a rate between about 75° C. per hour to about 500° C. per hour until at least the critical temperature and pressure of a liquid in the gel composition are reached;
   f. maintaining at least the critical temperature and pressure for a time sufficient to transform the liquid to a supercritical fluid; and
   g. reducing the pressure and temperature to ambient conditions by reducing the pressure at a rate above 500 psi per hour, and maintaining the temperature above at least the critical temperature until the critical pressure transition is passed.

2. The method of claim 1, wherein the fibers are selected to have a thermal conductivity less than about 1.0 W/m°K.

3. The method of claim 1, whereby there is formed an aerogel matrix composite that is substantially crack free.

4. The method of claim 1, whereby there is formed an aerogel matrix composite having substantially no volume shrinkage.

5. The method of claim 1, whereby there is formed an aerogel matrix composite having a volume shrinkage less than about 1 percent.

6. The method of claim 1, whereby the heating in step (e) is at a rate between about 100° C. per hour to about 150° C. per hour.

7. The method of claim 1, whereby the pressurizing in step (e) includes pressurizing above ambient pressure prior to applying heat.

8. The method of claim 7, whereby the pressurizing is above about 400 psig prior to applying heat.

9. A monolithic aerogel matrix composite formed by the method of claim 1.

10. A method for preparing an aerogel matrix composite comprising:
 a. making a first solution by mixing a metal alkoxide with an alcohol;
 b. making a second solution by mixing an alcohol, water, and base;
 c. mixing the first and second solutions to form a third solution and mixing fibers therewith;
 d. aging the third solution containing the fibers to obtain a gelled composition;
 e. completely submerging the gelled composition in a liquid suitable for supercritical drying;
 f. heating and pressurizing the gelled composition at a rate between about 75° C. per hour to about 500° C. per hour until at least the critical temperature and pressure of at least a major liquid in the gel composition are reached;
 g. maintaining at least the critical temperature and pressure for a time sufficient to transform the liquid to a supercritical fluid; and
 h. reducing the pressure and temperature to ambient conditions by reducing the pressure at a rate above 500 psi per hour, and maintaining temperature above at least the critical temperature until the critical pressure transition is passed.

11. The method of claim 10, wherein the alcohols of steps (a) and (b) and the liquid of step (e) are all the same alcohols.

12. The method of claim 10, whereby there is formed an aerogel matrix composite that is substantially crack free.

13. The method of claim 10, whereby there is formed an aerogel matrix composite having substantially no volume shrinkage.

14. The method of claim 10, whereby there is formed an aerogel matrix composite having a volume shrinkage less than about 1 percent.

15. The method of claim 10, whereby the heating in step (f) is at a rate between about 100° C. per hour to about 150° C. per hour.

16. The method of claim 10, whereby the pressurizing in step (f) includes pressurizing above ambient pressure prior to applying heat.

17. The method of claim 16, whereby the pressurizing is above about 400 psig prior to applying heat.

18. The method of claim 10, comprising:
 (1) in the first solution the metal alkoxide is Si-$(OCH_3)_4$ and the alcohol is methyl alcohol;
 (2) in the second solution the alcohol is methyl alcohol and the base is ammonia; and
 (3) the submerging liquid is methyl alcohol.

19. A monolithic aerogel matrix composite formed by the method of claim 10.

20. An aerogel matrix composite comprising:
 a. a monolithic aerogel; and
 b. fibers dispersed within the monolithic aerogel.

21. The composite of claim 20, comprising fibers randomly distributed throughout the monolithic aerogel.

22. The composite of claim 20, comprising fibers in the form of a mat or sheet.

23. The composite of claim 20, comprising fibers having a thermal conductivity of less than 1.0 W/m°K.

* * * * *